Patented Oct. 30, 1945

2,388,223

UNITED STATES PATENT OFFICE 2,388,223

PURIFICATION OF SUGAR SOLUTIONS AND THE LIKE

Abraham Sidney Behrman, Chicago, Ill., assignor to Infilco Incorporated, Chicago, Ill., a corporation of Delaware No Drawing. Application February 17, 1941, Serial No. 379,297

12 Claims. (Cl. 127—55)

The present invention relates to an improved process for the treatment of solutions containing organic substances, and has particular reference to an improved acid reduction process for such solutions.

A principal object of the invention is the provision of an acid reduction process for organic solutions of an impure nature by the use of a bed of an insoluble acid-adsorbing or removing material and by the preliminary protective use of activated carbon.

A further object of the invention is to treat impure acidic sugar solutions by passing the solution through or otherwise treating with activated carbon and then treating the solution with an acid-adsorbing or acid-removing substance of solid particle form which is subject to contamination by the colloidal or dissolved impurities present in the sugar solution upon reduction of the acidity.

Still another object of the invention is the treatment of impure organic acidic solutions with an insoluble acid adsorbent such as resins and the like, whereby the acid radical in the solution is removed and the pH of the solution is raised through a range of isoelectric points of substances present in the acidic solution, and subjecting the solution to a preliminary treatment with activated carbon for removal of substances which otherwise would be precipitated or removed as an impurity upon the acid-removing body.

A further specific object of the invention is the recovery of acetic acid from wood extract distillates, by passing the raw distillate solution through activated carbon to remove impurities which otherwise would be precipitated as impurities upon an acid-removing substance, and subsequently passing the solution through a water-insoluble material which has the capacity of absorbing the acetic acid of the solution, thereby removing the acetic acid from the solution in a relatively pure form.

These and other objects will be evident upon a consideration of the following description of a preferred embodiment of the invention.

In many industrial processes there are produced acidic solutions of organic materials. An example of such a process is to be had in the refining of beet sugar. In the acid conversion of starch products, a slurry of starch is subjected to the action of hydrochloric acid or other inorganic acids to convert the starch to dextrose. In this starch conversion process there are produced a relatively large number of complex organic bodies which are not dextrose, and the conversion liquor is highly acid by reason of the conversion acid.

The acidity of organic solutions of this nature may be reduced by passing the solutions through a bed of an acid-adsorbent material. Various acid-adsorbent materials of this nature may be employed. For example, m-phenylene diamine-formaldehyde resins of the type described by Adams and Holmes in the Journal of Society of Chemical Industry, January 11, 1935, pages 1–6T, have been used for the reduction of acidity. Aniline-aldehyde resins, guanidine formaldehyde resins, dicyandiamide resins, and insoluble metallic oxides can be used for this purpose.

The utility of anion-exchange or anion-removal bodies of this nature is hampered by the formation of impurities as solids on the bodies during the anion-exchange or removal operation.

The exact nature of the acid removal by such bodies is not known. In some cases it appears that the removal is by exchange of an OH group for the negative radical of the acid, while in other cases it appears that the removal is by way of absorption of the acid molecule. In either instance the solution is freed from the acid and use herein of the term acid-removal is intended to include both types of operation.

The acidity of the solution may vary widely. In the treatment of beet sugar juices with a hydrogen exchange zeolite, the resulting solution may have a pH of the order of 2 to 3. When passed in contact with an acid-removal body, the pH of the solution will usually rise to to about neutrality. As the pH of organic solutions of this type rises, there is an increased tendency for materials in the solution to precipitate upon the acid-removal body; in consequence the particles of acid-removal material may become coated, their acid-removal property lessened, their useful active life greatly shortened, and they may deteriorate at a rather rapid rate. In addition, the entire bed tends to become fouled and inoperable. Apparently, this tendency is due at least in part to the solution passing through an extensive series of isoelectric points of numerous impurities of colloidal or dissolved nature.

In accordance with the present process the disadvantages which have hampered the commercial use of these water-insoluble acid-removal bodies in the treatment of solutions of organic substances are eliminated by treating the acidic solution with activated carbon and then contacting the solution with the water-insoluble acid-removing body. In treatment with the activated carbon, an activated carbon of the decolorizing type is especially suitable. I prefer to use the carbon in granular form and in a bed through which the acidic organic liquor is passed. In general, the size of the carbon particles should be as small as hydraulic and other operating conditions will permit in order to provide maximum surface of the carbon particles per unit of volume. I have found a particle size of 20 to 40 mesh satisfactory in many cases. The depth of the carbon bed may be of the order of 2 to 4 feet. The acidic organic solution may be passed through the carbon bed at a rate of flow of the order of from 1 to 4 gallons per square foot per minute.

The treatment of the acidic organic solution with activated carbon in the manner described results in the removal from the solution of colloidal and dissolved impurities of the type which precipitate out upon the acid-removal body upon the decreasing acidity effected by the acid-removal body in the subsequent treatment. The passage of the solution through the activated carbon does not usually effect a substantial change in the pH of the solution, and the solution thereafter is passed through a suitable bed of the acid-removing material. The acid-removing treatment then is more effective by reason of the impurities which otherwise would be precipitated upon the acid-removing body having been removed by the activated carbon.

It is a characteristic of the treatment that frequent replacement of the activated carbon is not necessary. When the adsorptive capacity of the activated carbon is decreased upon continued treatment, the carbon may be regenerated or reactivated many times by simple treatment with a solution of an alkali. Sodium or potassium hydroxide are suitable substances for this purpose. A one-half to five per cent solution of sodium hydroxide has been found satisfactory. In the treatment of acidic beet sugar juices, I have found in certain cases that thirty gallons of one per cent caustic soda solution per cubic foot of carbon bed accomplishes effective regeneration for a large number of cycles.

After the acidic organic solution has been passed through the acid-removing body it generally will have a pH of 7 or more. The acid-removing body in time becomes exhausted and may be regenerated by treatment with an alkaline solution. One method which I have employed to advantage consists in regenerating the acid-removal body by use of a substantial excess of alkali solution and thereafter regenerating the activated carbon with the same solution. This eliminates the use of multiple solutions as well as multiple chemical mixing operations.

As an example of the operation of the process a beet sugar liquor treated with a hydrogen exchange material had a pH of about 2.3. This liquor was passed through a bed of activated carbon and thereafter was passed through a bed of synthetic acid-adsorbing or removing resins.

The effluent from the resin had a "purity" of 98 to 99 and a pH of above 7. The acid-removing body was utilized for more than 300 cycles without undue contamination by impurities in the sugar solution which otherwise would have been precipitated on the acid-removal body but for their previous removal from the solution by the activated carbon. It appears that the activated carbon has a selective adsorption, even under very low pH conditions, for many of the impurities which would otherwise precipitate upon an increase in pH resulting from the acid adsorption.

Another example of the operation of the process is to be had in the treatment of the distillate resulting from the evaporation and concentration of aqueous wood extracts. This distillate contains acetic acid and small quantities of complex organic impurities of such nature as to precipitate upon an acid-removal body when present in the solution. The condensate is passed through a bed of activated carbon and then through a bed of acid-removal material to produce an effluent of sufficient purity as to permit of its use as boiler feed water. Additionally, the acetic acid removed by the acid-removal body can be recovered in a relatively high state of purity. The following table gives a summary of the results of the treatment:

| | Raw liquor | 1<br>Through acid removal body alone | 2<br>Through carbon | 3<br>Then through acid removal body |
|---|---|---|---|---|
| Acidity:<br>  0.0071N<br>  0.045% | | 0<br>0 | | |
| Color (Pt-Co standard), 65 | | 55 | 0 | 0 |
| Oxygen consumed ppm, 96 | | 83 | 16 | 16 |
| Odor | | Definite | None | None |
| Alkalinity (M) ppm | | 12 | | 12 |
| pH | | 7.1 | | 7.1 |

The above table shows that where the condensate was directly treated with the acid-removal body the latter reduced the color of the solution as well as the oxygen consumption value. This results in a contamination of the acid-removal body. When the solution is passed through activated carbon the analysis is indicated in column 2. It will be seen that all of the color has been removed from the solution and the oxygen consumption has been reduced from 96 to 16, the odor also having been eliminated. In column 3 is shown the analysis of the solution after passing it through the acid removal body following the activated carbon treatment. From this analysis it will be seen that the acid-removal body is not contaminated by the color constituents of the solution and effects no reduction in the oxygen consumption of the solution. The effectiveness of the acid-removal body is the same where activated carbon has been utilized in the preliminary treatment as where no such preliminary treatment has been given the solution. That is, the effluents in each case will have a pH of 7.1 and a similar alkalinity.

In many other industrial operations there are produced organic solutions of an acidic nature which may be treated in accordance with the invention. The impurities present generally are organic in nature and the acid to be removed may be either organic or inorganic. In all such cases the activated carbon has a capacity of removing those substances which otherwise would precipitate upon the acid-removal body, and these impurities are usually of such nature as to be washed out of the activated carbon upon regeneration of the latter with an alkaline solution. These impurities apparently are of a complex nature. In the case of sugar solutions the impurities will consist of materials such as protein and amino-acids. The impurities may be present in either the dissolved or the colloidal form.

Various different types of water-insoluble acid-removing bodies may be employed in the process and different types of activated carbon are satisfactory for use. Modifications and alterations of the invention as described herein are intended to be included in the appended claims.

I claim:
1. The process of treating impure acidic solutions containing organic material which precipitates upon change in the pH of the solution, which comprises treating the solutions prior to treatment with a water-insoluble acid-removal body with active carbon to remove substances which would precipitate upon said water-insoluble acid-removal bodies upon contact therewith and thereafter subjecting said solution to treatment with a water-insoluble acid removal body to reduce the acidity of said solution through a range in which the separation of said substances would be enhanced if not previously removed from said solution.

2. The process of treating an acidic sugar bearing solution containing organic impurities, which comprises treating the solution with activated carbon and thereafter treating the solution with a water-insoluble acid-removal body.

3. The process of treating an impure aqueous liquid containing organic material which precipitates upon change in the pH of the solution and an acid, which comprises passing said liquid through a bed of granular activated carbon, and thereafter treating the liquid with a water-insoluble acid-removal body.

4. The process of treating an organic solution of an acid containing organic material which precipitates upon change of pH of the solution, which comprises passing said solution through a granular bed of activated carbon to remove said material and then passing said solution through a granular bed of a water-insoluble acid-removal substance.

5. The process of treating acetic acid-containing distillate from wood extract, which comprises passing said distillate through a bed of activated carbon to remove color and oxygen consumption substances, and thereafter passing said distillate through a granular bed of a water-insoluble acid-removal substance.

6. The process of claim 5 in which the carbon is regenerated with an alkaline solution and the acetic acid is recovered from said acid-removal substance.

7. A process for the purification of an acidic dextrose bearing solution containing organic impurities which comprises treating the solution successively with an active carbon and an acid-adsorbing body.

8. The process of treating an impure sugar solution containing colloidal impurities and an acid, which comprises treating said solution with an active carbonaceous material to remove said colloidal impurities, and thereafter treating said solution with a water insoluble acid-removal body to remove acid from said solution.

9. A process for the purification of acidic, starch conversion, dextrose liquor comprising treating said liquor successively with an activated carbon and an acid adsorbent resin.

10. In the process of treating starch with an inorganic acid to produce a converter liquor containing dextrose resulting from conversion of the starch and containing also substantial quantities of acid and also organic impurities, the improvement which comprises treating said liquor with an active carbon to separate impurities from said liquor and thereafter treating said liquor with a water insoluble acid removal body.

11. In the process of removing acid from an acidic solution containing organic material which precipitates upon change in the pH of the solution, said process including the treatment of such solution with a water insoluble acid removal body, the improvement which comprises treating such solution with active carbon immediately preceding treatment with the acid removal body, whereby organic materials which would otherwise precipitate upon the acid removal body are removed by the active carbon.

12. In the process of removing acid from an acidic sugar bearing solution containing organic impurities which precipitate upon change in the pH of the solution, said process including the treatment of such sugar bearing solutions with a water insoluble acid removal body, the improvement which comprises treating such solution with an active carbon immediately preceding treatment with the acid removal body.

ABRAHAM SIDNEY BEHRMAN.